United States Patent
Pirani et al.

(10) Patent No.: US 9,264,768 B2
(45) Date of Patent: *Feb. 16, 2016

(54) METHODS AND COMPUTER PROGRAM PRODUCTS FOR REPORTING INTERNET PROTOCOL TELEVISION RELATED DATA COLLECTED FROM APPLICATION AND DEVICE DATA

(71) Applicant: AT&T Intellectual Property I, L.P., Atlanta, GA (US)

(72) Inventors: Akbar Pirani, Marietta, GA (US); Michael Branam, Lawrenceville, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/198,018

(22) Filed: Mar. 5, 2014

(65) Prior Publication Data

US 2014/0189723 A1 Jul. 3, 2014

Related U.S. Application Data

(63) Continuation of application No. 13/572,292, filed on Aug. 10, 2012, now Pat. No. 8,695,026, which is a continuation of application No. 12/125,419, filed on May 22, 2008, now Pat. No. 8,261,299.

(51) Int. Cl.

| | |
|---|---|
| *H04N 21/442* | (2011.01) |
| *H04H 60/82* | (2008.01) |
| *H04N 21/25* | (2011.01) |
| *H04N 21/466* | (2011.01) |
| *H04N 21/61* | (2011.01) |
| *H04N 21/658* | (2011.01) |
| *H04H 60/33* | (2008.01) |
| *H04H 60/46* | (2008.01) |
| *H04H 60/66* | (2008.01) |

(52) U.S. Cl.
CPC ......... *H04N 21/44204* (2013.01); *H04H 60/82* (2013.01); *H04N 21/252* (2013.01); *H04N 21/4667* (2013.01); *H04N 21/6125* (2013.01); *H04N 21/6175* (2013.01); *H04N 21/6582* (2013.01); *H04H 60/33* (2013.01); *H04H 60/46* (2013.01); *H04H 60/66* (2013.01)

(58) Field of Classification Search
CPC ....... H04H 60/33; H04H 60/46; H04H 60/66; H04H 60/82; H04N 21/252; H04N 21/44204; H04N 21/4667; H04N 21/6125; H04N 21/6175; H04N 21/6582
See application file for complete search history.

(56) References Cited

U.S. PATENT DOCUMENTS

| | | | |
|---|---|---|---|
| 5,968,189 | A | 10/1999 | Desnoyers et al. |
| 7,096,486 | B1 | 8/2006 | Ukai et al. |
| 7,143,107 | B1 | 11/2006 | Nebres, Jr. |
| 2003/0066070 | A1 | 4/2003 | Houston |
| 2007/0157221 | A1 | 7/2007 | Ou et al. |
| 2007/0186228 | A1 | 8/2007 | Ramaswamy et al. |
| 2009/0024944 | A1 | 1/2009 | Louch et al. |
| 2009/0158311 | A1 | 6/2009 | Hon et al. |
| 2010/0138770 | A1 | 6/2010 | Lu et al. |
| 2010/0191726 | A1 | 7/2010 | Haveliwala |
| 2010/0223491 | A1 | 9/2010 | Ladd et al. |

OTHER PUBLICATIONS

R. Miller, "Weather Sites Remain Online During Storm," Aug. 30, 2005, Netcraft; pp. 1 of 2.
J. Schmitz, "Web Analytics of Hurricane Katrina," Nov. 2, 2007; Competepulse; pp. 1-2.

*Primary Examiner* — Rong Le
(74) *Attorney, Agent, or Firm* — Cantor Colburn LLP

(57) ABSTRACT

Methods and computer program products for reporting application and device data retrieved from within an Internet Protocol Television (IPTV) network environment are provided. IPTV system usage data is retrieved from at least one IPTV device and normalized into a predetermined data format. The IPTV system usage data is parsed according to predetermined criteria. The parsed IPTV system usage data is delivered to a dedicated data mart for storage, the IPTV system usage data that is stored within at least one dedicated data mart is accessed, and the IPTV system usage data that is stored at the at least one dedicated data mart is used to generate a report.

20 Claims, 6 Drawing Sheets

METHODS AND COMPUTER PROGRAM PRODUCTS FOR REPORTING INTERNET PROTOCOL TELEVISION RELATED DATA COLLECTED FROM APPLICATION AND DEVICE DATA

CROSS-REFERENCE TO RELATED APPLICATIONS

This is a continuation of U.S. Non-provisional application Ser. No. 13/572,292 filed Aug. 10, 2012, which is a continuation application of U.S. Non-provisional application Ser. No. 12/125,419 filed May 22, 2008, the contents of which are incorporated by reference herein.

BACKGROUND

Exemplary embodiments relate generally to Internet Protocol Television environments, and more particularly, to collecting Internet Protocol Television environment device usage information within an Internet Protocol Television environment.

Internet protocol television (IPTV) is a digital television delivery service wherein the digital television signal is delivered to residential users via a computer network infrastructure using the Internet Protocol. Typically, IPTV services are bundled with additional Internet services such as Internet web access and voice over Internet protocol (VOIP). A requirement for a user to play back IPTV operations is that a user has a computing device, such as a set top box, connected to their television for the reception of a digital signal. Used in conjunction with an IP-based platform, a set top box allows for a user to access an IPTV service and any additional services that are integrated within the IPTV service. IPTV service platforms allow for an increase in the interactive services that can be provided to a residential user. As such, a user can have access to a wide variety of content that is available via the IPTV service or the Internet.

BRIEF SUMMARY

Exemplary embodiments include a method for reporting application and device data retrieved from within an IPTV network environment. The method includes retrieving IPTV system usage data from at least one IPTV networked device, normalizing the retrieved IPTV system usage data into a predetermined data format, and parsing the IPTV system usage data according to predetermined criteria. The method further includes delivering the parsed IPTV system usage data to a dedicated data mart for storage, accessing the IPTV system usage data that is stored within at least one dedicated data mart, and utilizing the IPTV system usage data that is stored at the at least one dedicated data mart to generate a report.

Further exemplary embodiments include a method for retrieving application and device error data from an IPTV network environment. The method includes retrieving IPTV system usage data from at least one IPTV networked device, normalizing the retrieved IPTV system usage data into a predetermined data format, determining if the retrieved IPTV system usage data comprises at least one error occurrence, and analyzing any determined IPTV system usage error data. The method further includes parsing the IPTV system usage error data according to predetermined criteria, creating an error log notating the occurrences of determined IPTV system usage error, and determining if the occurrences of accumulated IPTV system usage error data are greater than a predetermined threshold.

Yet further exemplary embodiments include a method for delivering targeted content based upon IPTV system user data. The method includes retrieving IPTV system usage data from at least one IPTV networked device that is associated with an IPTV account, parsing the IPTV system usage data according to predetermined criteria, matching target user content to the predetermined criteria, associating the parsed IPTV system usage data with target user content that matches the predetermined criteria, and delivering the target user content to the at least one IPTV networked device.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

One or more exemplary embodiments are described below in detail. The disclosed embodiments are intended to be illustrative only since numerous modifications and variations therein will be apparent to those of ordinary skill in the art.

Within exemplary embodiments, user interface (UI) broadband enabled devices (e.g., UI enabled home telephones, cell phones, IPTV enabled televisions, etc.) are provided access to, and manipulate applications via, an IPTV operating environment. Devices are configured to execute an IPTV software platform (a core application) for accessing content over a two-way IP network. As such, a device can access any application software (secondary application) that has been created for a platform within the IPTV environment. Additionally, the application software implemented within an IPTV environment can be accessed and utilized by a user over multiple device types—as long as the devices are UI enabled—and thus provide a display interface to a device user. Networked devices are periodically polled by an IPTV infrastructure in order to collect information in regard to the activity usage of any networked device. The collected device usage information is aggregated and stored within the IPTV environment, wherein the collected device usage information can be accessed by further processing components that are comprised within the IPTV environment.

Figure 1:
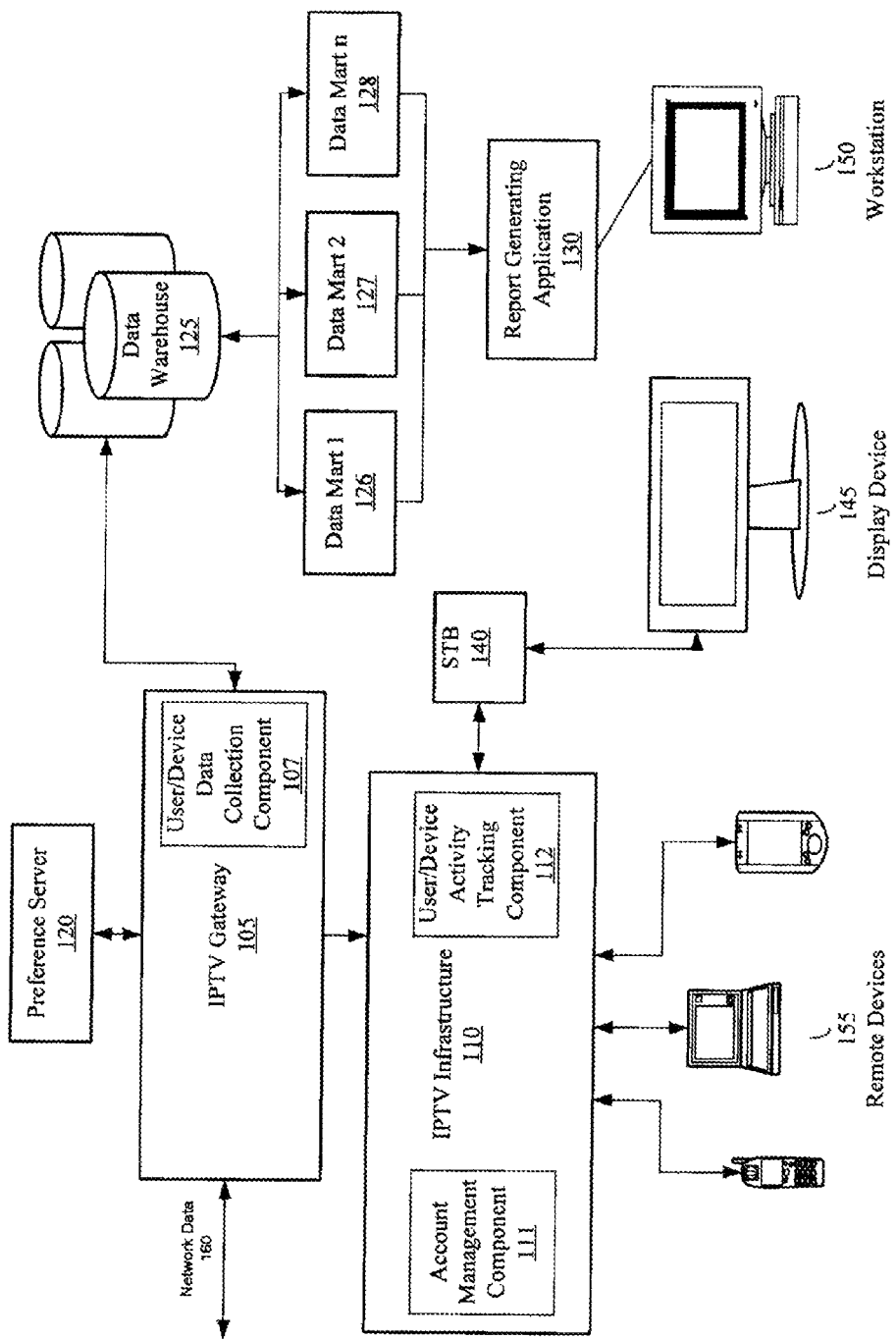
FIG. 1 is an illustration of a IPTV environment wherein media content is managed and delivered to a plurality of network devices in accordance with exemplary embodiments.

FIG. 1 shows an IPTV environment wherein media content is managed and delivered to a plurality of network devices in accordance with exemplary embodiments. As shown, the IPTV environment comprises an IPTV gateway 105, wherein the IPTV gateway serves as the conduit for data 160 that is received and transmitted to networks, such as the Internet, outside of the IPTV environment. The IPTV gateway 105 comprises a user and device data collection component 107. The IPTV environment also comprises an IPTV infrastructure 110. According to exemplary embodiments, the IPTV infrastructure 110 has a user IPTV account management component 111 and a user and device activity tracking component 112. A plurality of UI broadband enabled devices 155 in addition to a computing device 140, such as an IPTV set top box (STB), that is in communication with a display device 145 are in network communication with the IPTV infrastructure 110. Each networked device 155, 140 can be polled to retrieve its respective identification information, identification information that is associated with the IPTV account holder or user that is currently operating the device (155, 140), and the activity history of the device user within the IPTV environment. The UI broadband enabled devices 155 comprise an input means (e.g., keyboard, keypad or other data entry mechanism) and an output means (e.g., display screen, output speaker and sound card, etc.).

User and device activity information that is generated within the IPTV environment is stored at a data warehouse 125. According to exemplary embodiments, the stored data is parsed according to category determinations and thereafter the parsed information is stored at respective data marts 126, 127, and 128 that are dedicated to the storage of specific categories of information. The parsed user/device activity information that is stored at the respective data marts 126, 127, 128 can be accessed via a report generating application 130 in order to create custom IPTV user/device usage reports.

Within the exemplary embodiments, various communication and transmission protocols can be implemented to accomplish wired (e.g., telephonic communication, cable communication, power line communication, etc.) and wireless (e.g., Bluetooth, WiFi, Ultra-wideband, satellite transmission, etc.) communication and data transmission between the remote devices 155, the STB 140, and the IPTV infrastructure 110.

In order to access the IPTV environment, a device user may log in to the IPTV infrastructure 110 via a UI that is displayed at the remote device 155 or the display device 145. The account management component 111 handles the login operations for the IPTV environment in addition to managing the account operations for IPTV user accounts. As such, the account management component 111 may be tasked with provisioning a user account, an alias to the user account or a group of users or sub-account users (e.g., a family account or user authorized account co-users) with the respective services that are available to the account. Further, the account management component 111 may be tasked with managing the account records that are associated with each IPTV user account. The remote devices 155 are registered by an account user with the account management component 111, wherein the make and model of the remote device 155 is also annotated to the IPTV account user's IPTV account. The IPTV account, alias, and sub-account login information can consistently be instituted across varying platforms (core applications) and the devices 155. Further, exemplary aspects support the implementation of a single sign-on operation for the authorization and validation of a user's login within the IPTV environment.

IPTV system preference information (i.e., system configuration, display preference, etc.) may be acquired from an account user, wherein the preference information is associated with the user's IPTV account at the account management component 111 and delivered to a preference server 120 for storage. Further, user preferences that are set within the IPTV environment for respective applications may also be stored at the preference server 120. In further exemplary embodiments, user preference information can be derived from the monitored activities of a user within the IPTV environment and stored at the preference server 120.

Within further exemplary embodiments, the activity usage at the device 155, 140 or an application is monitored and captured. The user device 155, 140 and application usage data is monitored and collected by the user/device tracking component 112. Activity usage data can be collected based upon: a type of account that a user has; a preference profile that is associated with the user; the device 155, 140 with which the user accesses the IPTV environment; and the type of event/activity that the user has initiated within the IPTV environment. Further, captured event/activity data is annotated with information that indicates whether a data event or activity originated at a platform (core) or application software (secondary) operation.

For example, a user may log in to the IPTV environment via the remote device 155. Once logged-in, the user is presented with a series of graphical icons that represent applications at a GUI that is displayed at the remote device 155. Assume that the user is presented with graphical icons that represent a weather forecasting application and a yellow pages searching application. The user activates the weather forecasting application in order to see what the weather conditions are in a neighboring city. As a result of this activity, event information specifying the application that was accessed, the time of the event, and the length of time that the event lasted can be monitored and captured by the user/device tracking component 112. Further, the device 155 information in regard to the device 155 that the user used to access the IPTV account is noted in addition to any functional feature within the application that was accessed. Additionally, an object event ID is generated and associated with the captured activity usage information at the user/device activity tracking component 112.

In a further example, assume that the device 155 user executes the yellow page searching application in order to find the address and telephone number of a local restaurant. In the event that the device 155 is a home telephone or mobile telephone the application may comprise a "click-to-call" feature wherein the device user can select a displayed returned telephone number and initiate a telephone call by selecting the displayed telephone number with an input device at the remote device 155. In this instance, information in regard to the user, the device, the application that was accessed, and the features that were utilized within the application, the time the session was initiated, the length of the session, and the restaurant for which the search was originated can be logged at the user/device activity tracking component 112.

The raw data that is captured by the user/device activity tracking component 112 can be collected from a plurality of the potentially networked devices 155, 140. Further, the user/device activity tracking component 112 periodically polls all active network devices 155, 140 in order to determine if new activity or event data has been generated at the device 155, 140. Any captured raw data may be delivered to the user/device data collection component 107. According to exemplary embodiments, a dedicated function of the user/device data collection component 107 is to collect all of the user/device activity data within the IPTV environment and normalize the captured raw data into a predetermined format (e.g., XML, etc.). Thereafter, the user/device collection component 107 parses the normalized data according to predetermined categories (e.g., user preference information, device type information, activity information, etc.). The normalized parsed data is thereafter delivered to the data warehouse 125 for storage, wherein the data warehouse 125 is configured to facilitate the querying and analysis of the stored data. At the data warehouse 125, the parsed data is pushed to the data marts 126, 127, and 128. According to exemplary embodiments, the data marts 126, 127, 128, are created and configured based upon predetermined criteria—for example, the current and project operational and business needs of a company which may require that a data mart be created to store user device information or user event activity that occurred within a specific application.

Data that is stored within a respective data mart (126, 127, and 128) is made available to a report generating application 130. The report generating application 130 can be accessed from an IPTV environment networked computer workstation 150. As such, the report generating application 130 is configured to provide the workstation 150 operator with the capability to build a custom report that is based upon the user/device data that is stored at the data marts 126, 127, and 128 via a GUI that is displayed at the workstation 150. For example, a customized report could be generated based upon the number of IPTV customers that utilized the yellow pages application or that searched for a weather forecast for a particular city within a particular time period. These findings can be crossed-referenced with the type of device 155, 140 that was used to initiate the activity events and the result output at the workstation 150 or saved for further processing.

Figure 2:
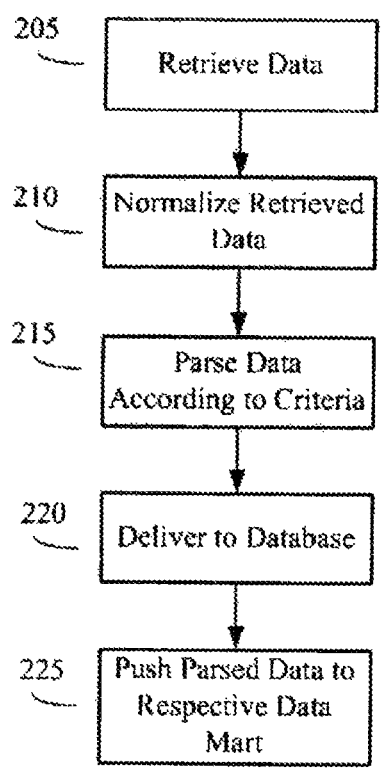
FIG. 2 is a flow diagram detailing the retrieval and storage of device user usage information in accordance with exemplary embodiments.

FIG. 2 shows a flow diagram detailing a method for the reporting of application and device data retrieved from within an IPTV network environment, according to exemplary embodiments. As shown in FIG. 2, the usage data of an IPTV system user is retrieved by, e.g., the user/device collection component 107 from at least one IPTV networked device 155 and the STB 140 at step 205. At step 210 the retrieved usage data is normalized by the user/device collection component 107 into a predetermined format. At step 215 the normalized usage data is parsed user/device collection component 107 according to predetermined criteria, and thereafter at step 220, the IPTV system usage data is delivered to database warehouse 125 for storage. Lastly, at step 225 the respectively parsed IPTV system usage data is pushed to a dedicated data mart, such as the data mart 126, 127, 128, for storage. Once the data has been pushed to the data marts 126, 127, and 128, the data may be accessed by the report generating application 130 for the creation for customized data reports.

Figure 3:
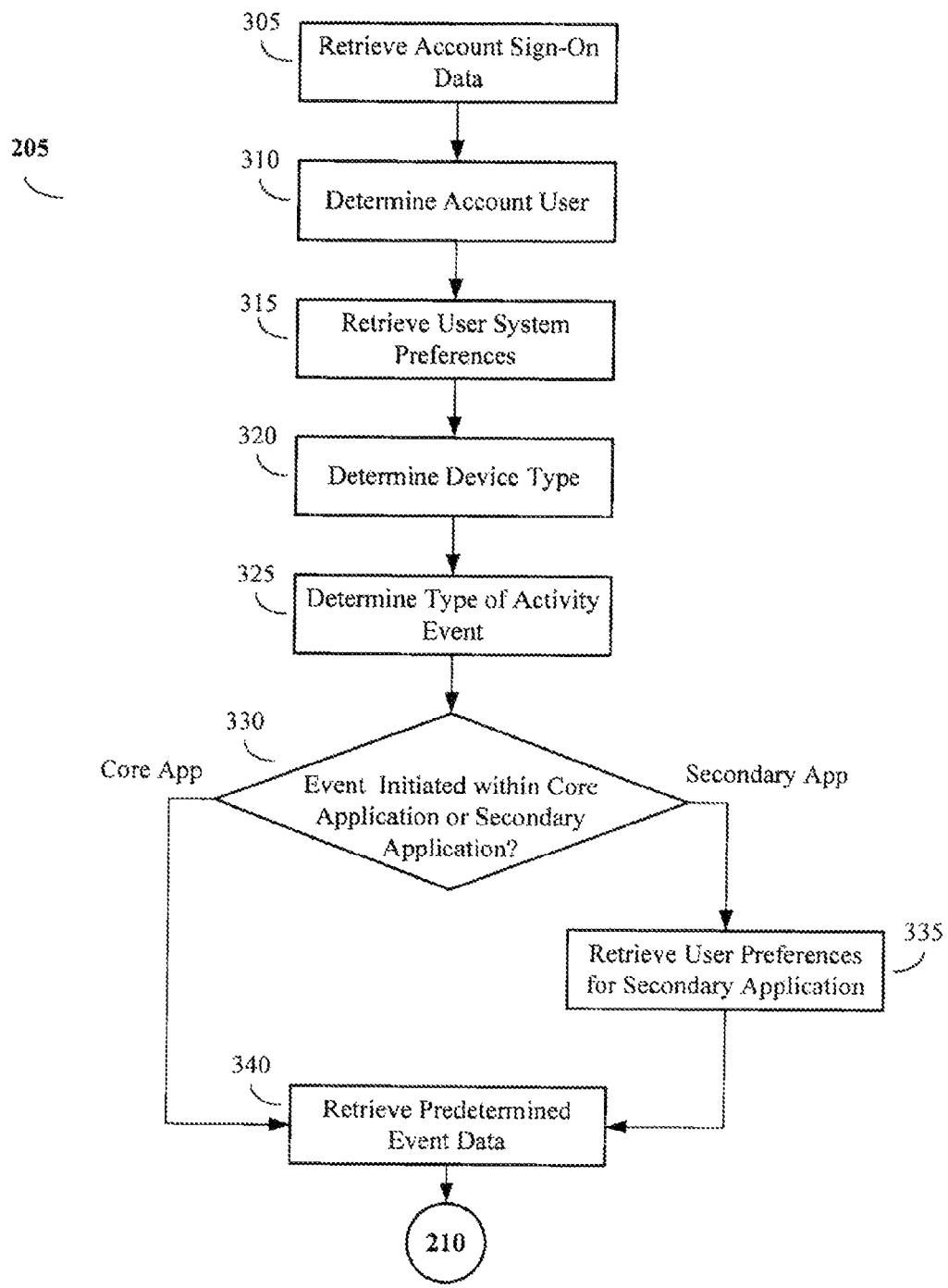
FIG. 3 is a flow diagram detailing a method for the retrieval of information from an IPTV networked device in accordance with exemplary embodiments.

FIG. 3 shows a flow diagram illustrating an exemplary user/device data retrieval operation of step 205 of FIG. 2 in accordance with exemplary embodiments. At step 305, the account information that is associated with an IPTV account login operation at the device 155 or STB 140 is retrieved by, e.g., the account management component 111. At step 310, the account user that is associated with the login session is determined by the account management component 111. At step 315, the account preferences that are associated with the account user are retrieved by, e.g., the account management component 111. Next, at step 320, the device type of the device 155 and the identification information that is associated with the device used to access the IPTV infrastructure 110 are retrieved by, e.g., the user/device activity tracking component 112.

Information is generated in regard to the activity/event that has been initiated at the device 155 or STB 140. At step 325 the information that has been generated in regard to the activity/event type is retrieved by the user/device activity tracking component 112. At step 330, a determination is made at the user/device activity tracking component 112 as to if the current activity or event was initiated within the core application or via secondary application software. In the event that it is determined that the activity event has been initiated within a secondary application, then at step 335, the user preferences for the secondary application are retrieved. Lastly, at step 340 all predetermined criteria of activity and event data that is generated at the device 155, 140 user's login session is retrieved by the user/device activity tracking component 112. If it is determined that the activity event has been initiated within the core application, then the method proceeds directly to step 340.

Within further exemplary embodiments, the user/device data collection component 107 analyzes the normalized data in order to determine if any error data is present within the collected usage information. Error data is generated in the instance that performance levels of activity sessions that are initiated via the core application and any application software are determined not to meet predetermined performance metrics or IPTV system implemented performance requirements. The error data is parsed in accordance with the other usage data, but in the instance that it is determined that the occurrences of errors has reached a predetermined threshold, an error report detailing the type of error occurrences is automatically generated and forwarded to a system administrator.

The normalized parsed data is thereafter delivered to the data warehouse 125 for storage, wherein the data warehouse 125 is configured to facilitate the querying and analysis of the stored data. At the data warehouse 125, the parsed data is pushed to the data marts 126, 127, and 128. According to exemplary embodiments, the data marts 126, 127, 128, are created and configured based upon predetermined criteria—for example, the current and project operational and business needs of a company which may require that a data mart be created to store user device information or user event activity that occurred within a specific application in addition to error data.

Figure 4:
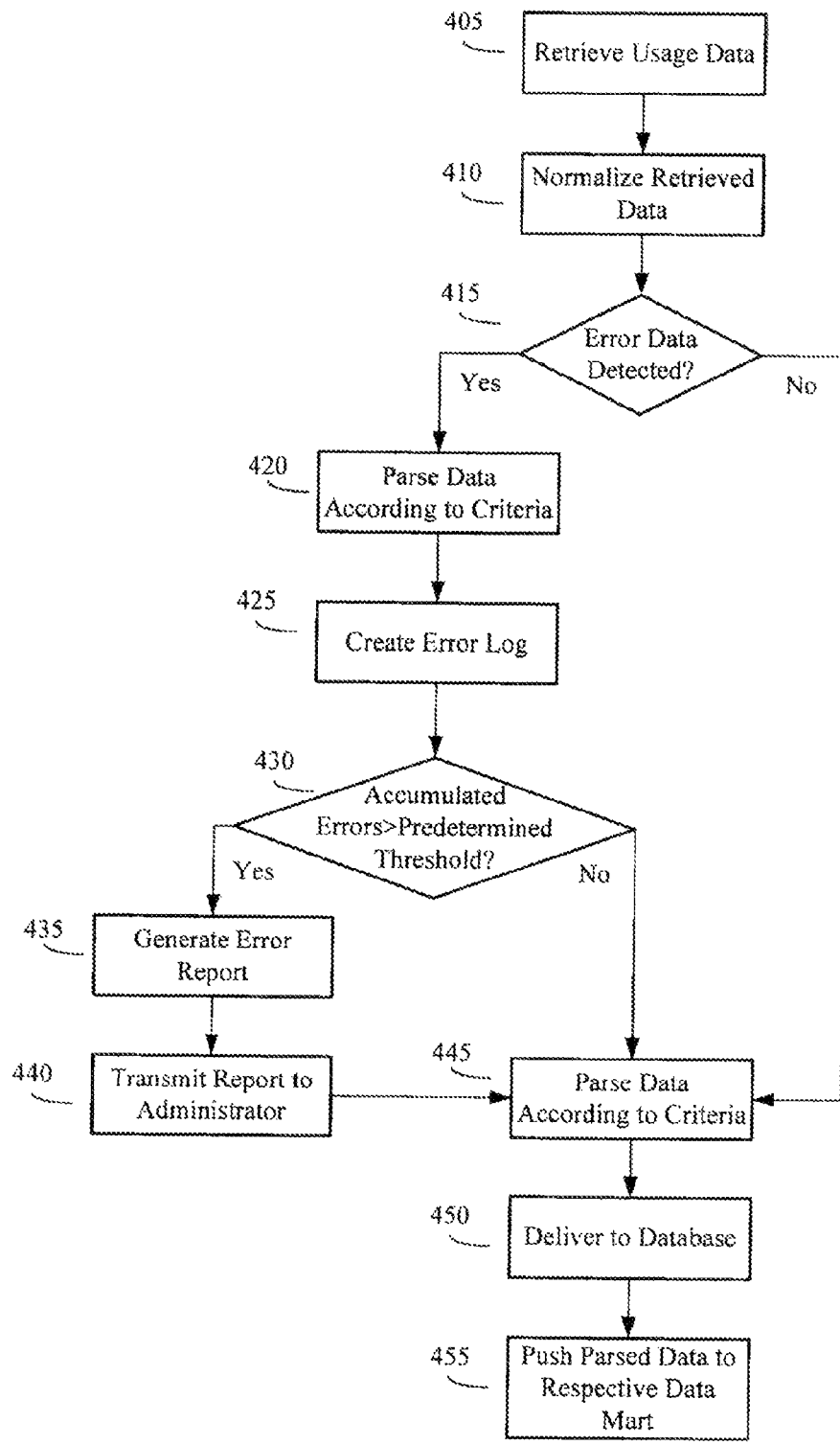
FIG. 4 is a flow diagram detailing the detection of generated error event device user usage information in accordance with exemplary embodiments.

FIG. 4 shows a flow diagram detailing a method for the reporting of application and device error data retrieved from within an IPTV network environment, according to exemplary embodiments. As shown in FIG. 4 the usage data of an IPTV system user is retrieved by the user/device data collection component 107 from at least one IPTV networked device 155 and the STB 140 at step 405. At step 410, the retrieved usage data is normalized by the user/device data collection component 107 into a predetermined format. At step 415, the normalized data is analyzed at the user/device data collection component 107 to determine if an error data is present. In the instance where error data is detected, then at step 420, the error data is parsed at the user/device data collection component 107 according to predetermined categorization criteria. Thereafter, at step 425 an error log data is created detailing the occurrence and type of detected error. The error log data may be created by an error logging/reporting component that may be included in one of the data marts 126, 127, 128. At step 430, a determination is made, e.g., at the user/device data collection component 107 to ascertain if the detected errors have exceeded a predetermined threshold range. In the instance that the number of errors has exceeded the threshold, an error report is generated (step 435), e.g., by the error logging/reporting component included in one of the data marts 126, 127, 128 and forwarded to a system administrator detailing the occurrences and types of errors (step 440).

From step 440, a determination at step 430 that the number of detected errors has not exceeded the threshold, or a determination at step 415 that an error is not detected, the collected usage data is parsed by the user/device data collection component according 107 to predetermined criteria at step 445. Thereafter at step 450, the IPTV system usage data is delivered to a database warehouse 125 for storage. Lastly, at step 455 the respectively parsed system usage data is pushed to a dedicated data mart 126, 127 or 128 for storage. Once the data has been pushed to the data marts 126, 127, and 128 the data may be accessed by the report generating application 130 for the creation for customized data reports.

Figure 5:
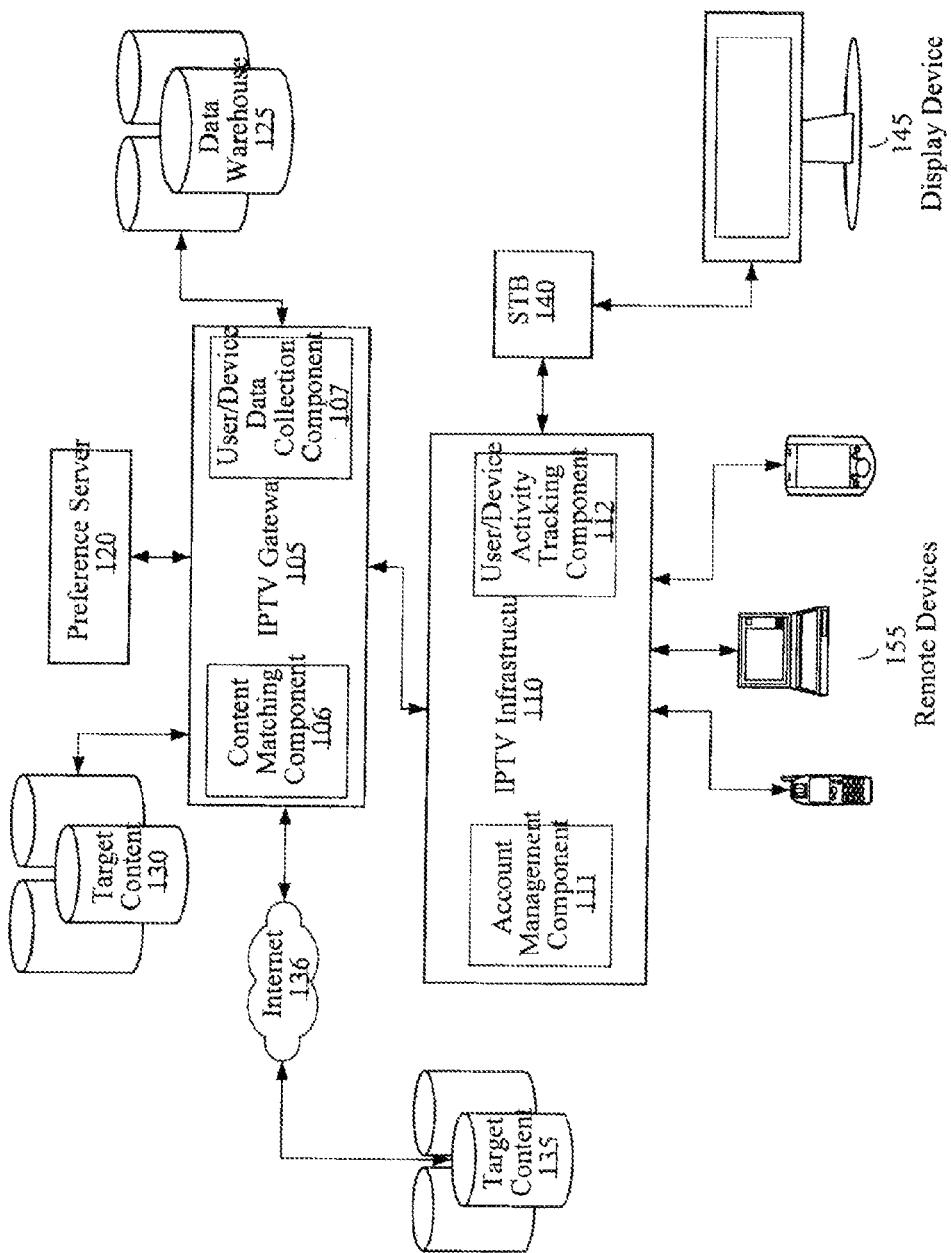
FIG. 5 is an illustration of a IPTV environment wherein media content is managed and targeted content is delivered to a plurality of network devices in accordance with exemplary embodiments.

As shown in FIG. 5, within additional exemplary embodiments the user specific raw data that is delivered to the user/device data collection component 107 is also delivered to a content matching component 106. The purpose of this operation is to make a determination to if there is content that is stored locally 130 or remotely 135 that may be of potential interest to a device (155, 140) user based upon the user's IPTV account usage activities. Content stored remotely 135 may be delivered to the IPTV Gateway 105 via a network 136, such as the Internet. For example, if the device (155, 140) user initiates a series of yellow page searches for restaurants that serve particular types of food, then a determination may be made that the device (155, 140) user may want to receive advertisements from restaurants that serve the particular type of food that the device (155, 140) user frequently searches. A further example would be if the device (155, 140) user frequently performs searches within a reference application program for particular types of animals, then in this instance it may be determined that the device (155, 140) user may want to receive additional content relating to the particular types of animals that the device (155, 140) user has performed search operations upon.

Figure 6:
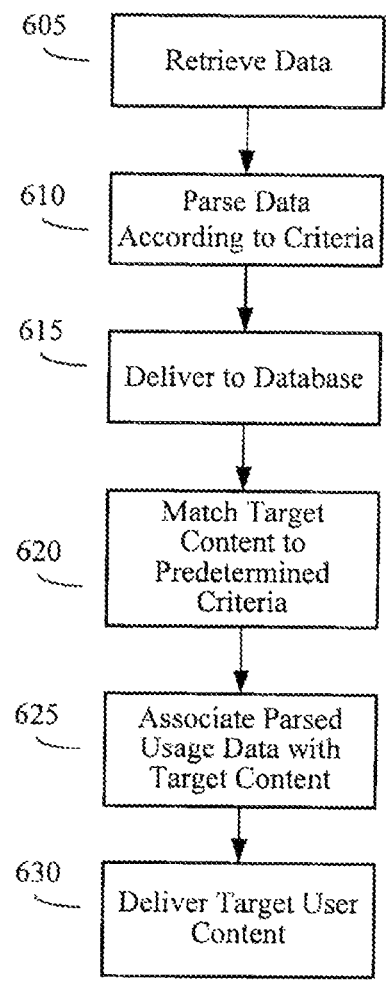
FIG. 6 is a flow diagram detailing the retrieval and storage of device user usage information and delivery of targeted content to a device in accordance with exemplary embodiments.

FIG. 6 shows a flow diagram detailing a method for the delivery of targeted content based upon IPTV system user, according to exemplary embodiments. As shown in FIG. 6, the usage data of an IPTV system user is retrieved by the user/device data collection component 107 from at least one of the IPTV networked device 155 or STB 140 at step 605. The retrieved usage data is normalized into a predetermined format, and at step 610, the normalized usage data is parsed according to predetermined criteria by the user/device data collection component. Thereafter at step 615, the IPTV system usage data is delivered to the database warehouse 125 for storage. At step 620, the parsed data is also delivered to the content matching component 106, wherein the parsed data is analyzed according to predetermined matching criteria to determine if the parsed data can be associated with any category of target content. At step 625, the target content that has been identified is associated with the IPTV account user's account by, e.g., the content matching component 106, and also a reference to the target content is saved at the data warehouse 125. At step 630, the target content is retrieved from either the local storage area 130 or the remote storage 135, and delivered to the IPTV account user via a networked device 155 or STB 140.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for reporting application and device data retrieved from within an internet protocol television network environment, the method comprising:

retrieving, by a device activity tracking component stored on an internet protocol television infrastructure, internet protocol television system usage data from a user device;

wherein the device activity tracking component stored on the internet protocol television infrastructure is separate from the user device;

normalizing, by a data collection component stored on an internet protocol television gateway, the internet protocol television system usage data that has been retrieved into a predetermined data format;

wherein the data collection component stored on the internet protocol television gateway is connected to a preference sever and to the internet protocol television infrastructure;

parsing, by the data collection component, the internet protocol television system usage data according to predetermined criteria;

delivering, by the data collection component stored on the internet protocol television gateway, the internet protocol television system usage data that has been parsed to dedicated data marts comprising a first dedicated data mart, a second dedicated data mart, and a third dedicated data mart for storage;

wherein the device activity tracking component stored on the internet protocol television infrastructure determines when a current activity is initiated by a core application and a secondary application, in which the core application is an internet protocol television software platform on the user device and the secondary application is software created for the core application;

wherein based on the device activity tracking component determining that the current activity is initiated within the secondary application, the device activity tracking component retrieves user preferences for the secondary application in which the user preferences are stored on the preferences server; and wherein the device activity tracking component annotates current activity data with information that distinguishes whether the current activity originated at the core application or the secondary application.

2. The method of claim 1, further comprising accessing the internet protocol television system usage data that is stored within the dedicated data marts;

utilizing the internet protocol television system usage data that is stored at the dedicated data marts to generate reports, the reports comprising a first report for a number of customers that utilized a search directory application and a second report for a number of customers that searched with a weather application to search a weather forecast for a particular city within a particular time period; and responsive to an event corresponding to utilizing the weather application, capturing event information specifying that the weather application was accessed, a time of the event, a length of time that the event lasted, and functional features that were accessed within the weather application;

wherein retrieving the internet protocol television system usage data further comprises retrieving an identity of the user device that is accessing an internet protocol television system.

3. The method of claim 1, wherein retrieving the internet protocol television system usage data further comprises retrieval of internet protocol television account sign-on information that is associated with an internet protocol television account.

4. The method of claim 3, further comprising retrieving preference information that has been associated with the internet protocol television account.

5. The method of claim 1, further comprising identifying an account user that is associated with an internet protocol television account.

6. The method of claim 1, wherein retrieving the internet protocol television system usage data further comprises retrieving information in regard to an activity event type that is initiated at the user device.

7. The method of claim 1, wherein the internet protocol television infrastructure comprises a user internet protocol television account management component.

8. The method of claim 1, wherein the internet protocol television infrastructure comprises an account management component.

9. The method of claim 1, further comprising retrieving information that is generated by the current activity.

10. The method of claim 1, wherein the user device is periodically polled for the internet protocol television system usage data generated by an internet protocol television system user.

11. A system for reporting application and device data retrieved from an internet protocol television network environment, the system comprising:

an internet protocol television hardware infrastructure;

a device activity tracking component stored on the internet protocol television hardware infrastructure;

wherein the device activity tracking component stored on the internet protocol television hardware infrastructure is distinct and separate from a user device; and a data collection component stored on an internet protocol television gateway;

wherein the data collection component stored on the internet protocol television gateway is connected to a preference sever and to the internet protocol television hardware infrastructure;

wherein the device activity tracking component retrieves internet protocol television system usage data from the user device;

wherein the device activity tracking component normalizes the internet protocol television system usage data retrieved into a predetermined data format;

wherein the device activity tracking component stored on the internet protocol television hardware infrastructure determines when a current activity is initiated by a core application and a secondary application, in which the core application is an internet protocol television software platform on the user device and the secondary application is software created for the core application;

wherein based on the device activity tracking component determining that the current activity is initiated within the secondary application, the device activity tracking component retrieves user preferences for the secondary application in which the user preferences are stored on the preferences server; and wherein the device activity tracking component is configured to annotate current activity data with information that distinguishes whether the current activity originated at the core application or the secondary application.

12. The system of claim 11, wherein the device activity tracking component determines if the internet protocol television system usage data is internet protocol television system usage error data that comprises error occurrences.

13. The system of claim 12, wherein the device activity tracking component analyzes the internet protocol television system usage error data.

14. The system of claim 13, wherein the device activity tracking component parses the internet protocol television system usage error data according to predetermined criteria.

15. The system of claim 14, wherein the device activity tracking component creates an error log notating the error occurrences in the internet protocol television system usage error data; and wherein the device activity tracking component determines if the error occurrences of accumulated internet protocol television system usage error data are greater than a predetermined threshold; and wherein the internet protocol television system usage error data is analyzed to identify a type and frequency of respective ones of the error occurrences.

16. The system of claim 15, wherein retrieving the internet protocol television system usage data further comprises retrieving an identity of the user device that is accessing the internet protocol television network environment.

17. The system of claim 16, wherein retrieving the internet protocol television system usage data further comprises retrieval of internet protocol television account sign-on information that is associated with an internet protocol television account.

18. The system of claim 17, wherein in an event that the error occurrences in the internet protocol television system usage error data is greater than a predetermined threshold, an error report is generated and delivered to a system administrator.

19. The system of claim 18, wherein retrieving the internet protocol television system usage data further comprises identifying an account user that is signed-on to the internet protocol television account.

20. A computer program product, tangibly embodied on a computer readable medium, for reporting application and device data retrieved from within an internet protocol television network environment, the computer program product including instructions that, when executed by a computer, cause the computer to perform operations comprising:

retrieving, by a device activity tracking component stored on an internet protocol television infrastructure, internet protocol television system usage data from a user device;

wherein the device activity tracking component stored on the internet protocol television infrastructure is separate from the user device;

normalizing, by a data collection component stored on an internet protocol television gateway, the internet protocol television system usage data that has been retrieved into a predetermined data format;

wherein the data collection component stored on the internet protocol television gateway is connected to a preference sever and to the internet protocol television infrastructure;

parsing, by the data collection component, the internet protocol television system usage data according to predetermined criteria;

delivering, by the data collection component stored on the internet protocol television gateway, the internet protocol television system usage data that has been parsed to dedicated data marts comprising a first dedicated data mart, a second dedicated data mart, and a third dedicated data mart for storage;

wherein the device activity tracking component stored on the internet protocol television infrastructure determines when a current activity is initiated by a core application and a secondary application, in which the core application is an internet protocol television software platform on the user device and the secondary application is software created for the core application;

wherein based on the device activity tracking component determining that the current activity is initiated within the secondary application, the device activity tracking component retrieves user preferences for the secondary application in which the user preferences are stored on the preferences server; and wherein the device activity tracking component annotates current activity data with information that distinguishes whether the current activity originated at the core application or the secondary application.

\* \* \* \* \*